(12) United States Patent
Goto

(10) Patent No.: US 6,990,946 B2
(45) Date of Patent: Jan. 31, 2006

(54) STARTING SYSTEM FOR PILOT-IGNITION GAS ENGINE

(75) Inventor: Satoru Goto, Tokyo (JP)

(73) Assignee: Niigata Power Systems Co., Ltd., (JP)

( * ) Notice: Subject to any disclaimer, the term of this patent is extended or adjusted under 35 U.S.C. 154(b) by 0 days.

(21) Appl. No.: 10/474,235

(22) PCT Filed: Feb. 7, 2002

(86) PCT No.: PCT/JP02/01018

§ 371 (c)(1),
(2), (4) Date: Oct. 3, 2003

(87) PCT Pub. No.: WO03/067065

PCT Pub. Date: Aug. 14, 2003

(65) Prior Publication Data

US 2004/0107941 A1    Jun. 10, 2004

(51) Int. Cl.
*F02B 19/10* (2006.01)
(52) U.S. Cl. .................................. 123/275
(58) Field of Classification Search ............ 123/275, 123/277, 260
See application file for complete search history.

(56) References Cited

U.S. PATENT DOCUMENTS 3,636,933 A * 1/1972 Ohtani et al. ............... 123/357
6,209,511 B1 * 4/2001 Goto et al. .................. 123/275

FOREIGN PATENT DOCUMENTS

| JP | 58-107834 | 6/1983 |
| JP | 58-117329 | 7/1983 |
| JP | 59-137349 | 9/1984 |
| JP | 11-324805 | 11/1999 |

* cited by examiner

Primary Examiner—Andrew M. Dolinar
(74) Attorney, Agent, or Firm—Ostrolenk, Faber, Gerb & Soffen, LLP

(57) ABSTRACT

The object of the present invention is to enable the reliable compression ignition from starting of a pilot oil ignition gas engine in whose cylinder head there is provided a precombustion chamber unit with pilot injection valve that has liquid fuel injection valves and a precombustion chamber by using the injection of pilot oil from the liquid fuel injection valves, and to thereby allow the engine to be started smoothly. The position of a fuel rack (fuel control rod) that controls the discharge quantity of fuel injection pumps that feed pilot oil to the liquid fuel injection valves is controlled by a control apparatus via a rack control actuator (a position control actuator). In addition, the control apparatus counts the engine speed from pulses generated by a speed sensor and, in a region where the engine speed is low, sets the discharge quantity of the fuel injection pumps to a large quantity. As a result, pilot oil is reliably injected from the liquid fuel injection valves, and gaseous fuel is reliably ignited and burned.

12 Claims, 6 Drawing Sheets

CONTROLLED SYSTEM AT THE TIME OF ENGINE STARTING
AND CHANGES IN THE QUANTITY OF STATE THEREOF

RELATIONSHIP BETWEEN CURRENT SIGNAL
AND FUEL RACK CONTROL OBJECTIVE POSITION

CONTROLLED SYSTEM AT THE TIME OF ENGINE STARTING
AND CHANGES IN THE QUANTITY OF STATE THEREOF

RELATIONSHIP BETWEEN ENGINE SPEED
AND FUEL RACK POSITION WHERE FUEL
INJECTION CAN BE STARTED

STARTING SYSTEM FOR PILOT-IGNITION GAS ENGINE

BACKGROUND OF THE INVENTION

1. Field of the Invention

The present invention relates to a starter for a precombustion chamber type pilot oil ignition gas engine in which a precombustion chamber with liquid fuel injection valve is provided in a cylinder head, and a mixture of air and gaseous fuel that is introduced into a main combustion chamber and compressed is ignited and burnt by pilot oil injected from the liquid fuel injection valve.

2. Description of the Related Art

Conventionally, the engine shown in FIG. 8 is known as a precombustion chamber type pilot oil ignition gas engine that drives a stationary type of power generation installation for industrial or public use.

This type of gas engine 1 has a cylinder liner (cylinder) 2, a piston 3 that moves reciprocally up and down inside the cylinder liner 2, and a precombustion chamber unit 6 with liquid fuel injection valve that is provided with a liquid fuel injection valve 4 and a precombustion chamber 5. Fuel gas (gaseous fuel) such as city gas is mixed with air and is supplied via an intake port of a cylinder head 7 to a main combustion chamber 8 which walls are formed by the cylinder liner 2, the piston 3, and the cylinder head 7. In addition, in the latter half of the compression stroke of the piston 3, fuel oil corresponding to approximately 1% of the total quantity of heat is injected as pilot oil from the liquid fuel injection valve 4 into the precombustion chamber 5. This results in the pilot oil being compression ignited in a high temperature—high pressure atmosphere and the fuel gas inside the main combustion chamber 8 is then burnt using the pilot oil as an ignition source.

A jerk fuel injection pump, which is designed so that a small discharge quantity can be reliably obtained, is used as the fuel injection pump for supplying fuel oil (i.e., pilot oil) to the liquid fuel injection valve 4. Because this jerk fuel injection pump is driven by revolution of the engine via a camshaft, it is affected by an engine speed. In this jerk fuel pump, the relationship between the position of the fuel rack (fuel control rod) which starts fuel injection and the number of engine revolutions (i.e., the engine speed) is shown in FIG. 7. As can be seen in FIG. 7, the smaller the indicated value for the fuel rack position that sets the fuel injection quantity, the wider the range of the engine speed where there is no injection (i.e., the region of the engine revolutions where injection of the fuel oil from the liquid fuel injection valve 4 is not started). For example, if the fuel rack position is set to 8 mm, which is the position corresponding to the discharge quantity of the pilot oil is approximately 1% of the total quantity of heat, the pilot oil is not injected from the liquid fuel injection valve until the engine speed reaches approximately 600 rpm.

Furthermore, in this gas engine 1 the compression ratio is lowered in comparison with a diesel engine in order to avoid knocking during gas operation. Therefore, particularly when the engine is in transition from starting to run-up, if the injection of pilot oil from the liquid fuel injection valve has started, compression ignition of this pilot oil is only achieved with difficulty. In particular, if the engine cooling water is at a low temperature, the compression ignition becomes noticeably more difficult.

Because the gas engine cannot be started in this state, an ignition device 9, such as an ignition plug or a glow plug, is provided in addition to the liquid fuel injection valve 4 so that fuel gas introduced into the main combustion chamber 8 is ignited and the engine is started. However, in this case, because the ignition device 9 is required in addition to the liquid fuel injection valve 4, problems arise in that the engine structure is more complex and costs rise due to the increased number of components.

The present invention was conceived in view of the above circumstances and it is an object thereof to provide a starter for pilot oil ignition gas engine that can reliably inject pilot oil from a liquid fuel injection valve from the time the engine is started, and that can smoothly start the engine.

It is a further object of the present invention to provide a starter for pilot oil ignition gas engine that enables compression ignition to be performed stably using pilot oil when the engine is started even when the engine cooling water is at low temperature.

SUMMARY OF THE INVENTION

In order to solve the aforementioned problems, the present invention has the following features.

Namely, the first aspect of the present invention is a starter for pilot oil ignition gas engine in which, in a main combustion chamber partitioned off by a cylinder, a piston that moves reciprocally inside the cylinder, and a cylinder head having a precombustion chamber with liquid fuel injection valve, a fuel air mixture made up of a gaseous fuel and air that is introduced into the main combustion chamber and is compressed by the piston is ignited by pilot oil injected from the liquid fuel injection valve into the precombustion chamber and burned thereby enabling the pilot oil ignition gas engine to provide drive output, wherein there is provided a controller that controls a position of a fuel control rod that controls a discharge quantity of a fuel injection pump that supplies the pilot oil to the liquid fuel injection valve based on an engine speed.

In this starter for pilot oil ignition gas engine, gaseous fuel from a gaseous fuel supply source is mixed with air from an intake port of the cylinder head to form a fuel-air mixture, which is then supplied to the main combustion chamber and compressed by the piston. A portion of this compressed fuel-air mixture enters the precombustion chamber and, in the latter half of the compression stroke of the piston, is ignited by pilot oil injected from the liquid fuel injection valve by the operation of the fuel injection pumps. The portion of the fuel-air mixture remaining inside the main combustion chamber is then burned by the flames created by this ignition.

At this time, the controller operates and the position of the fuel control rod that adjusts the discharge quantity of the fuel injection pumps is controlled based on the engine speed. As a result, regardless of the engine speed, the discharge quantity of the fuel injection pumps that cause pilot oil to be injected from the liquid fuel injection valve is secured.

According to this starter for pilot oil ignition gas engine, by adjusting the movement of the fuel control rod to a position where the discharge quantity of the fuel injection pump in the low speed region of the engine speed is increased, it is possible to inject pilot oil from the liquid fuel injection valve from the time of starting of the engine. As a result, the ignition and combustion of a fuel-air mixture of gaseous fuel and air inside the main combustion chamber is performed with certainty and it is possible to start the engine smoothly.

The second aspect of the present invention is the starter for pilot oil ignition gas engine described above, wherein, in a low speed region of the engine speed, the controller controls the fuel control rod in a position where the discharge quantity of the fuel injection pump is increased, while, in a high speed region of the engine speed, the controller controls the fuel control rod in a position where the discharge quantity of the fuel injection pump is decreased.

In this starter for pilot oil ignition gas engine, because control is performed by the controller such that the discharge quantity of the fuel injection pumps increases in the low speed region of the engine speed, a sufficient quantity of pilot oil needed to start injection is supplied to the liquid fuel injection pump, and the injection of pilot oil from the liquid fuel injection valves into the precombustion chamber is performed reliably even at the start of the engine. Moreover, because control is performed by the controller such that the discharge quantity of the fuel injection pumps decreases in the high speed region of the engine speed, the supply of superfluous pilot oil to the liquid fuel injection valve is prevented in the high speed region where a large amount of pilot oil is not required to start injection by the liquid fuel injection valve, thereby conserving pilot oil.

The third aspect of the present invention is the starter for pilot oil ignition gas engine according to the above described second aspect, wherein, in the low speed region where the engine speed is a predetermined value or less, the position of fuel control rod is a fixed position where the discharge quantity of the fuel injection pump is at maximum, while, in the high speed region where the engine speed is a predetermined value or greater, the position of fuel control rod is a fixed position where the discharge quantity of the fuel injection pump is at minimum, while, in an intermediate speed region between the low speed region and the high speed region, the discharge quantity of the fuel injection pump changes in accordance with the engine speed from a fixed position where the discharge quantity of the fuel injection pump is at maximum to a fixed position where the discharge quantity of the fuel injection pump is at minimum.

In this starter for pilot oil ignition gas engine, because the minimum quantity of pilot oil needed to start injection by the liquid fuel injection valves in accordance with the engine speed is supplied from the fuel injection pumps to the liquid fuel injection valves, pilot oil is used efficiently and the engine is started smoothly.

The fourth aspect of the present invention is the starter for pilot oil ignition gas engine according to the above described first through third aspects, wherein the controller is provided with an engine speed sensor that detects the engine speed, a position control actuator that adjusts a position of the fuel control rod by moving the fuel control rod, and a control apparatus that, based on a relationship between the engine speed and a position of the fuel control rod that is set in advance, calculates a control objective position for the fuel control rod relative to the engine speed detected by the engine speed sensor, and moves the position control actuator such that the position of the fuel control rod is adjusted to the calculated control objective position.

In this starter for pilot oil ignition gas engine, the position of the fuel control rod is controlled by the control apparatus using the position control actuator, and the discharge quantity of the fuel injection pumps is appropriately set to the quantity of pilot oil needed to start injection by the liquid fuel injection valves in accordance with the engine speed detected by the engine speed sensor. As a result, the injection of pilot oil from the liquid fuel injection valves into the precombustion chamber proceeds even more efficiently and the engine is started smoothly and reliably.

The fifth aspect of the present invention is the starter for pilot oil ignition gas engine according to the above described first through fourth aspects, wherein, in the cylinder head there is further provided an ignition device that performs an ignition operation before the pilot oil is injected from the liquid fuel injection valve, and ignites the fuel air mixture of gaseous fuel and air that is compressed inside the main combustion chamber.

In this starter for pilot oil ignition gas engine, because the ignition and combustion generated by the ignition of pilot oil from the liquid fuel injection valves is accelerated by the ignition of a fuel-air mixture of gaseous fuel and air by an ignition device, the rate of misfire at the time of engine run-up is reduced and combustion stability is improved. As a result, the total hydrocarbons in the exhaust gas are reduced and explosions in the exhaust pipe system are avoided, allowing a reduction in the rise time before a rated speed is reached to be achieved. Note that, the quantity of total hydrocarbons in the exhaust gas depends to a major extent on the quantity of fuel gas that cannot be burned completely because of combustion defects and is exhausted from the main combustion chamber.

The sixth aspect of the present invention is the starter for pilot oil ignition gas engine according to the above described fifth aspect, wherein the ignition device stops ignition operation when the engine speed reaches the rated speed.

In this starter for pilot oil ignition gas engine, because the ignition device stops ignition operation when the engine speed reaches the rated speed, unnecessary use of the ignition device is prevented thereby extending the lifespan of the ignition device.

DESCRIPTION OF THE PREFERRED EMBODIMENTS

Embodiments of the present invention will now be described with reference made to the attached drawings.

Figure 1:
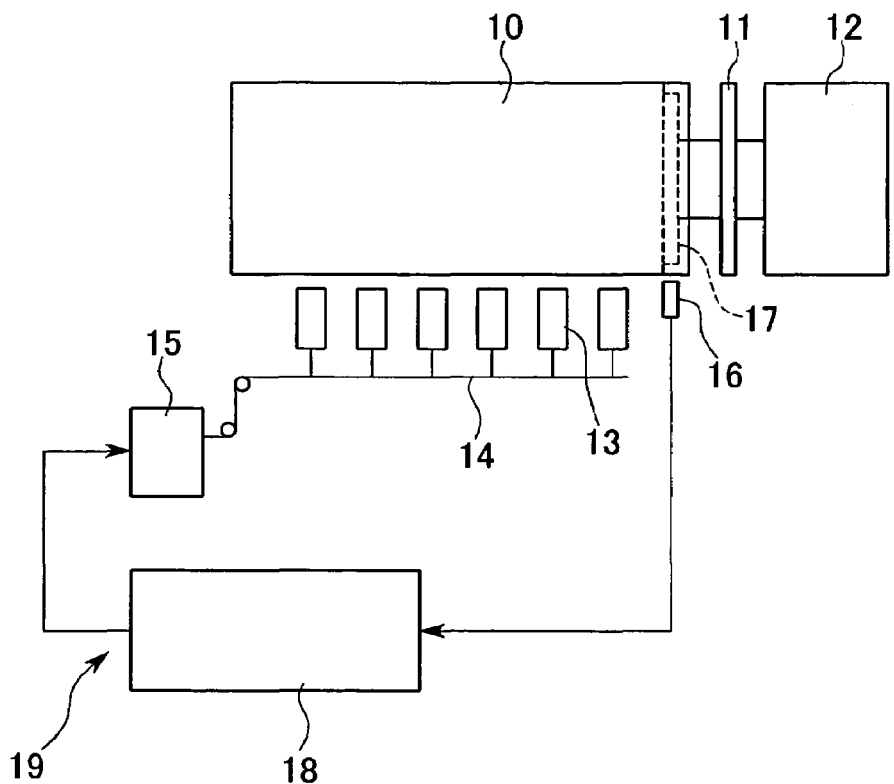
FIG. 1 is a control block diagram showing an embodiment of the starter for pilot oil ignition gas engine according to the present invention.

In FIG. 1, 10 is a pilot oil ignition gas engine (hereinafter abbreviated to "gas engine"). This pilot oil ignition gas engine 10 forms a portion of a stationary power generation installation as a result of a power generator 12 being linked via a coupling 11 to an output shaft thereof.

Figure 8:
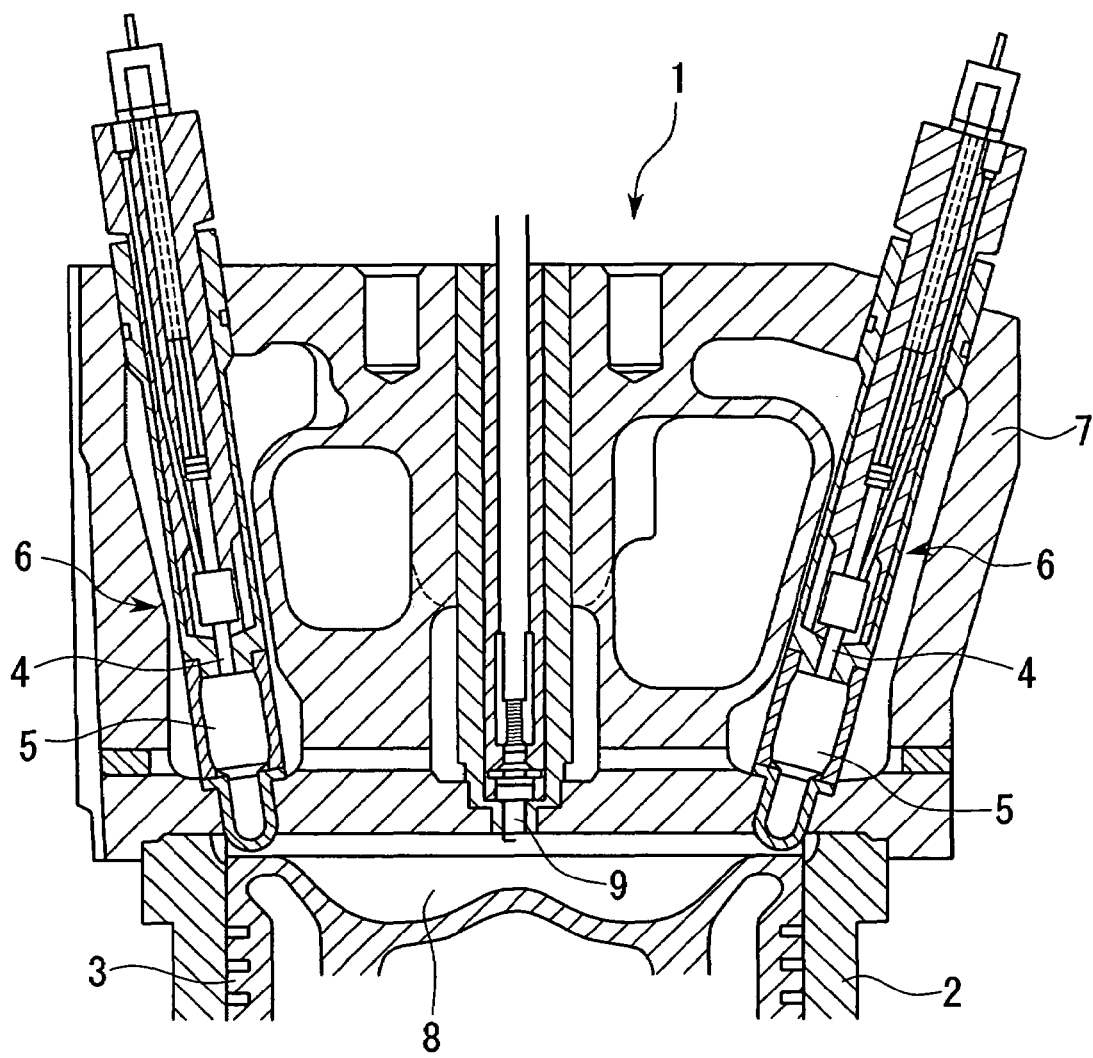
FIG. 8 is a vertical cross-sectional view showing an example of principle portions of a conventional pilot oil ignition gas engine.

In the same manner as for the conventional pilot oil ignition gas engine 1 shown in FIG. 8, the gas engine 10 has a structure in which a cylinder head 7 is mounted on a cylinder liner 2 inside which is inserted a piston 3. Inside the cylinder head 7, the gas engine 10 is further provided with an ignition device 9 and also with a precombustion chamber unit 6 with liquid fuel injection valve that is provided with a liquid fuel injection valve 4 and a precombustion chamber 5. The description below of portions peripheral to the combustion chamber, such as the cylinder head 7 of the gas engine 10, is based, according to necessity, on FIG. 8.

In FIG. 1, 13 is a jerk fuel injection pump (i.e., a fuel injection pump) provided for each cylinder head 7 of the gas engine 10. The jerk fuel injection pumps 13 are driven by camshafts linked via a gear train, which is formed by an intermediate gear or the like, to a crankshaft of the gas engine 10, and are set such that a small amount of oil is injected in a stable manner. Pilot oil discharged from the fuel injection pumps 13 is supplied via pilot oil pipes (not shown) to the liquid fuel injection valves 4 provided in each cylinder head 7.

A fuel rack (i.e., a fuel control rod) 14 is linked to each fuel injection pump 13 and simultaneously operates mechanism portions that set the discharge quantity of pilot oil in each fuel injection pump 13. The position of the fuel rack 14 can be moved by the operation of a rack control actuator (i.e., a position control actuator) 15 linked to the fuel rack 14. In addition, the discharge quantity of pilot oil is set relative to the position of the fuel rack 14.

The rack control actuator 15 is constructed such that it is moved as a result of an operating rod being pulled by an electromagnetic coil, and the distance of the movement of the operating rod is set by the size of quantity of electricity supplied to the electromagnetic coil. An example of a relationship between the position of the fuel rack 14 moved by the rack control actuator 15 and the size of the quantity of electricity (i.e., the current) supplied to the rack control actuator 15 is shown in FIG. 2.

16 is a speed sensor that detects the engine speed of the gas engine 10. The speed sensor 16 is formed by a magnetic pickup or the like, and is positioned so as to face teeth surfaces of a ring gear 17 mounted on the crankshaft of the gas engine 10. The speed sensor 16 detects the teeth surfaces of the ring gear 17 and sends pulses that are thereby generated to a control apparatus 18. The control apparatus 18 counts the pulses sent from the speed sensor 16 per unit time, measures the number of engine revolutions (i.e., the engine speed), and calculates a position for the fuel rack 14 that is the control objective for that particular engine speed (i.e., a control objective position) based on a control objective line C2 of the relationship between the engine speed and the position of the fuel rack shown in FIG. 3.

Figure 2:
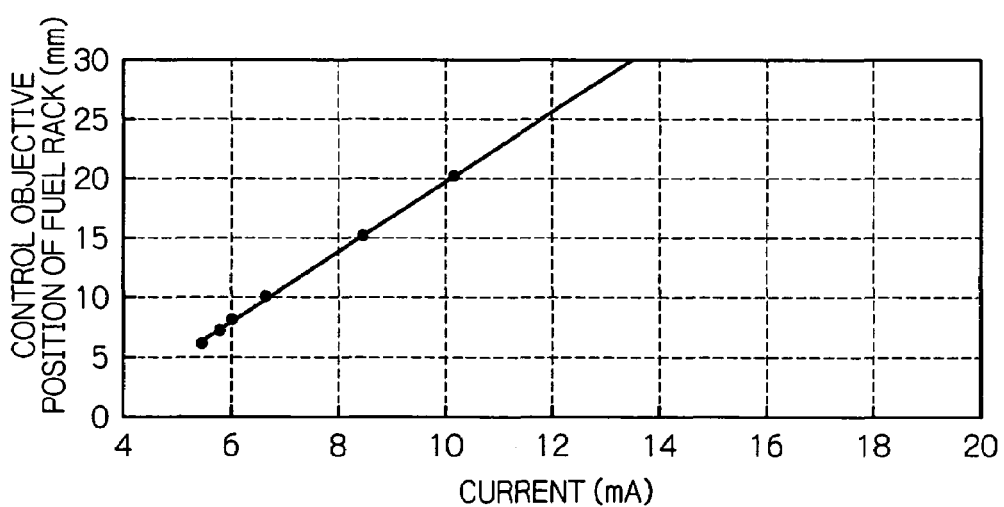
FIG. 2 is a chart showing an example of a relationship between a current signal and a control target position of a fuel rack.

In addition, the control apparatus 18 determines the quantity of electricity corresponding to the control objective position calculated for the fuel rack 14 based on the relationship shown in FIG. 2, and this is then output to the rack control actuator 15 as a command signal.

A controller 19 that controls the position of the fuel rack 14, which adjusts the discharge quantity of the fuel injection pumps 13, based on the engine speed is formed by the rack control actuator 15, the speed sensor 16, and the control apparatus 18.

Figure 3:
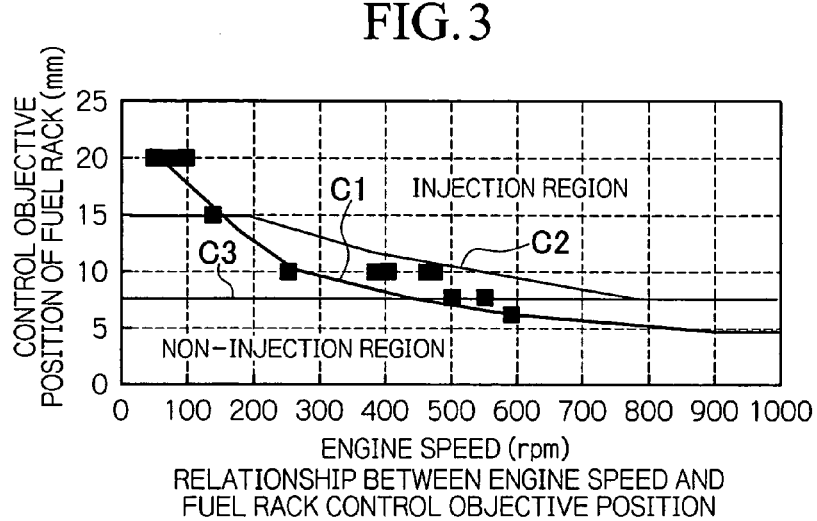
FIG. 3 is a chart showing an example of a relationship between an engine speed and a control target position of a fuel rack.
Figure 4:
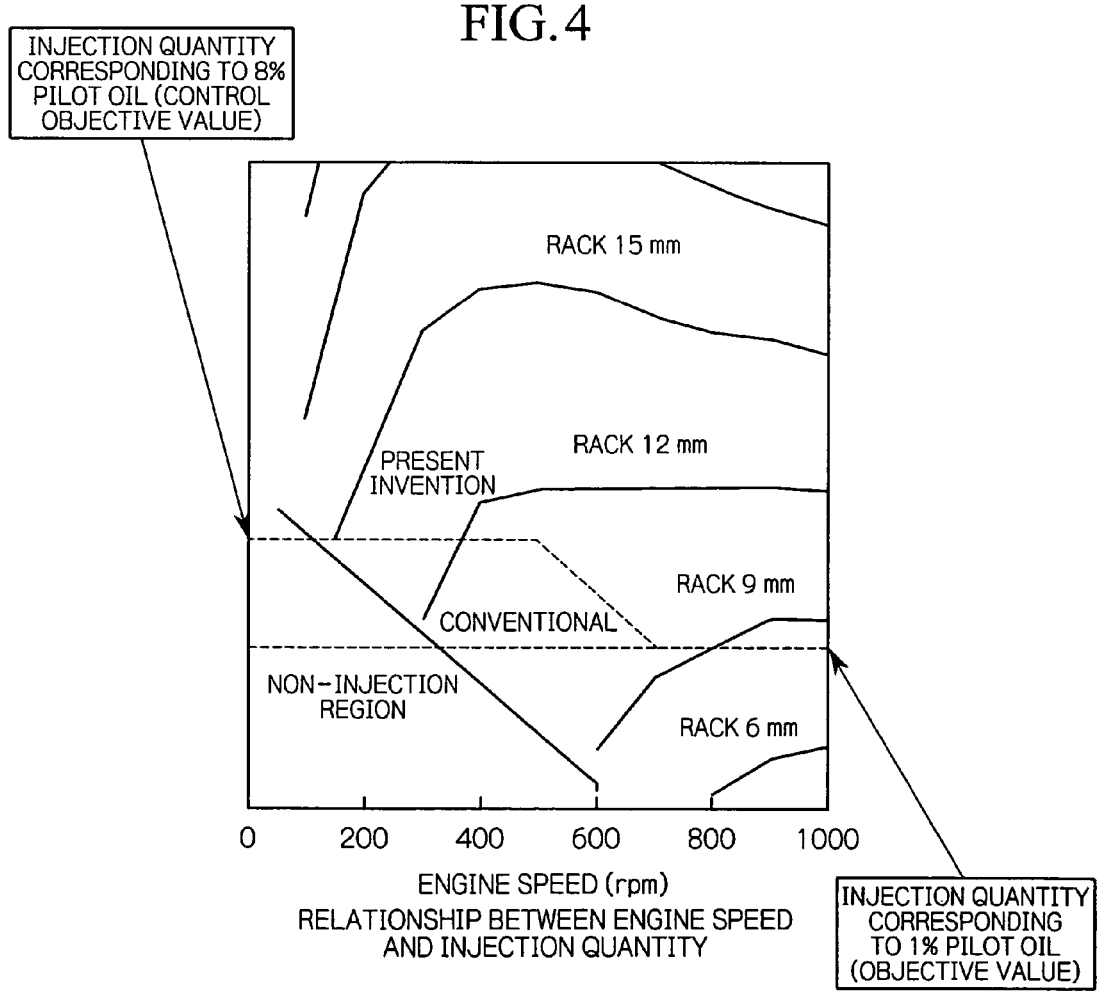
FIG. 4 is a chart showing an example of a relationship between the engine speed and the injection quantity of pilot oil.

Note that the relationship between the engine speed and the position of the fuel rack 14 shown in FIG. 3 is determined by the following process. An injection testing apparatus or a pilot oil ignition gas engine testing apparatus is operated beforehand, and, for each position of the fuel rack 14, if the injection quantity of pilot oil from the liquid fuel injection valves 4 relative to the engine speed is measured, the characteristics shown in FIG. 4 are obtained. FIG. 3 shows the results obtained when, from the characteristics shown in FIG. 4, the minimum engine speed in the injection region where the injection of pilot oil from the liquid fuel injection valve 14 is commenced is determined at each position of the fuel rack 14, and this minimum engine speed is then corresponded to the position of the fuel rack 14. From the results shown in FIG. 3, the characteristic curve C1 showing the boundary between the injection region and the non-injection region is obtained.

Using the control objective line C2, in the low engine speed region (the low speed region) where the engine speed is 200 rpm or less, the control objective position of the fuel rack 14 is set at a fixed position of 15 mm, at which position the liquid fuel injection valves 4 inject pilot oil, with a quantity of pilot oil corresponding to a quantity of heat ratio of approximately 8% of the quantity of heat required for rated load operation of the engine taken as the maximum injection quantity. Moreover, in the high engine speed region (the high speed region) where the engine speed is 800 rpm or more, the control objective position of the fuel rack 14 is set at a fixed position of 8 mm at which position pilot oil corresponding to 1%, as quantity of heat ratio, is injected. Furthermore, in the intermediate speed region between the low speed region and the high speed region, the control objective position of the fuel rack 14 is set so as to become gradually smaller from a position of 15 mm to a position of 8 mm.

Moreover, in the region where the engine speed is 150 rpm or more, the control objective position of the fuel rack is set using the control objective line C2 such that there is a displacement from the characteristic curve C1 that forms the boundary between injection region and the non-injection region of the liquid fuel injection valve 4. In contrast, in a conventional gas engine, as is shown by the control objective line C3, the control objective position of the fuel rack 14 is set at a uniform fixed position regardless of the engine speed. As is clear from a comparison of the control objective lines C2 and C3, in the present invention, injection of pilot oil is performed reliably over a wider range of the engine speed than is the case with a conventional gas engine.

Next, the operation of the starter for pilot oil ignition gas engine 10 having the above described structure will be described.

At the starting of the gas engine 10, if fuel gas (i.e., a gaseous fuel) from a gaseous fuel supply source (not shown) is introduced into an intake port or the like of the cylinder head 7, starting of the gas engine 10 is commenced by a starter. The gaseous fuel and air are mixed together in the intake port or the like to form a fuel-air mixture that is then supplied to the main combustion chamber 8. This fuel-air mixture is compressed by the piston 3 inside the main combustion chamber 8. A portion of the compressed fuel-air mixture goes into the precombustion chamber 5 and, in the latter half of the compression stroke of the piston 3, is ignited by pilot oil injected from the liquid fuel injection valves 4 by the operation of the fuel injection pumps 13. The portion of the fuel-air mixture remaining inside the main combustion chamber 8 is then burned by the flames created by the ignition, causing the gas engine 10 to commence revolution.

When the gas engine 10 commences revolution, the gaseous fuel supplied to the interior of the main combustion chamber 8 is increased by the operation of an engine governor. As a result, the engine speed of the gas engine 10 gradually increases and reaches a rated speed after a predetermined time.

At the starting of the gas engine 10, the controller 19 operates such that the control apparatus 18 thereof counts the pulses detected by the speed sensor 16 and calculates the engine speed. The control apparatus 18 then determines a control objective position for the fuel rack that corresponds to the calculated engine speed based on the control objective line C2 shown in FIG. 3. Because the maximum control objective position corresponding to the low engine speed region is set by the control objective line C2, the control apparatus 18 sends a signal commanding a large quantity of electricity corresponding to this control objective position to the rack control actuator 15. As a result, the rack control actuator 15 moves the position of the fuel rack 14 by the maximum distance, and the fuel injection pumps 13 are adjusted such that the maximum quantity of pilot oil is discharged.

Because of this, the quantity of pilot oil discharged from the fuel injection pumps 13 (i.e., the quantity of compressed oil) is increased, and the oil pressure inside the pilot oil pipes linking the fuel injection pumps 13 to the liquid fuel injection valves 4 is raised enough for pilot oil to be reliably injected from the liquid fuel injection valves 4 even at a low engine speed. As a result, the ignition and burning of fuel-air mixture inside the main combustion chamber 8 is reliably performed, and starting of the gas engine 10 is achieved smoothly.

Note that, even if the position of the fuel rack 14 at starting of the gas engine 10 is set to the maximum control objective position, the maximum discharge quantity from the fuel injection pumps 13 does not exceed the quantity of heat ratio of approximately 8% relative to when the engine is operating at rated load operation, as described above. Accordingly, it is not possible to generate sufficient torque to raise the gas engine 10 to the rated speed, and no obstacle to the operation of the gas engine 10, namely, to the control of the engine speed by the engine governor is created.

If the engine speed of the gas engine 10 is raised, the control apparatus 18 adjusts the control objective position of the fuel rack 14 such that it is gradually lowered from the maximum position, in accordance with the control objective line C2 shown in FIG. 3, based on the results of detections by the speed sensor 16. At a predetermined engine speed or higher, the rack control actuator 15 adjusts the position of the liquid fuel injection valve to the control objective position such that approximately 1%, as a quantity of heat percentage, of pilot oil is injected from the liquid fuel injection pump 14. As a result, in the high engine speed region of the gas engine 10, the fuel-air mixture inside the main combustion chamber 8 is ignited and burned by the injection of a small quantity of pilot oil, and the engine is put into operation.

Figure 5:
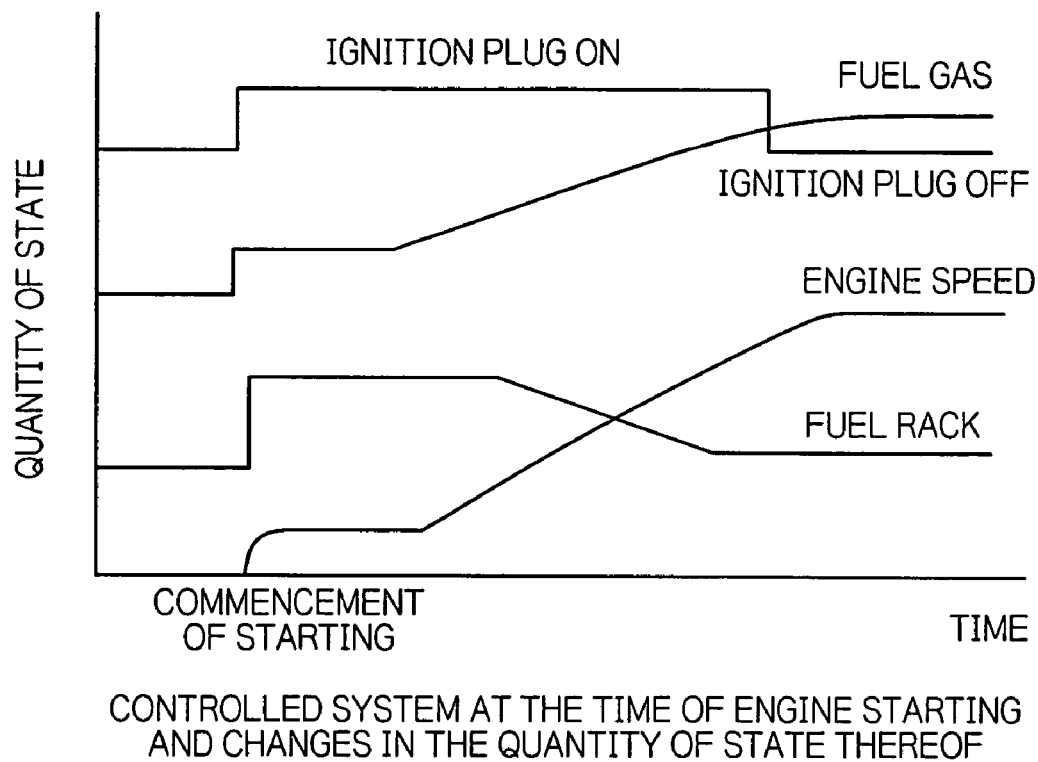
FIG. 5 is a chart showing an example of a controlled system at the time of engine run-up and changes in the quantity of state thereof.

In the operation of the gas engine 10, changes in the respective control objectives (i.e., the position of the fuel rack 14, the engine speed, the quantity of fuel gas supplied, and the ON/OFF operations of the ignition plugs) at engine revolution startup as well as changes in the quantities of state thereof over time from the starting of the engine are as shown in FIG. 5.

In this example, over a predetermined time after the starting of the engine, the ignition plugs (ignition devices) 9 provided in the cylinder head 7 are operated so that the fuel-air mixture inside the main combustion chamber 8 is ignited. If a structure such as this is employed, because the precombustion chamber 5 is heated by heat generated by the ignition and combustion of the fuel-air mixture so that the compression ignition of the pilot oil injected from the liquid fuel injection valves 4 is accelerated, the ratio of misfires at engine run-up is reduced and the combustion stability is improved. As a result, the total hydrocarbons in the exhaust gas are reduced and explosions in the exhaust pipe system are avoided, allowing a reduction in the rise time before the rated speed is reached to be achieved.

The operating time of the ignition of the ignition plug 9 is set to the commencement time of the starting, and the ignition plug 9 ignites either simultaneously or immediately prior to the injection of pilot oil from the liquid fuel combustion valve 4. The stopping time of the ignition is set to the point when the rated speed of the gas engine 10 is detected by the speed sensor 16, or the point when it is detected that the voltage generated by the generator 12 has reached a rated voltage. By employing a structure such as this, unnecessary operation of the ignition plug 9 is restricted and the lifespan thereof is lengthened.

According to this starter for the pilot oil ignition gas engine 10, in the low engine speed region, because the fuel control rod 14 is moved to a control objective position where the discharge quantity of the fuel injection pumps 13 is increased, it is possible for pilot oil fed from the fuel injection pumps 13 to be injected from the liquid fuel injection valves 4 into the precombustion chamber 5 even in the low engine speed region at the starting of the engine. As a result, the ignition and combustion of fuel-air mixture formed by gaseous fuel and air inside the main combustion chamber 8 is reliably performed and a smooth engine start can be obtained.

Figure 6A:
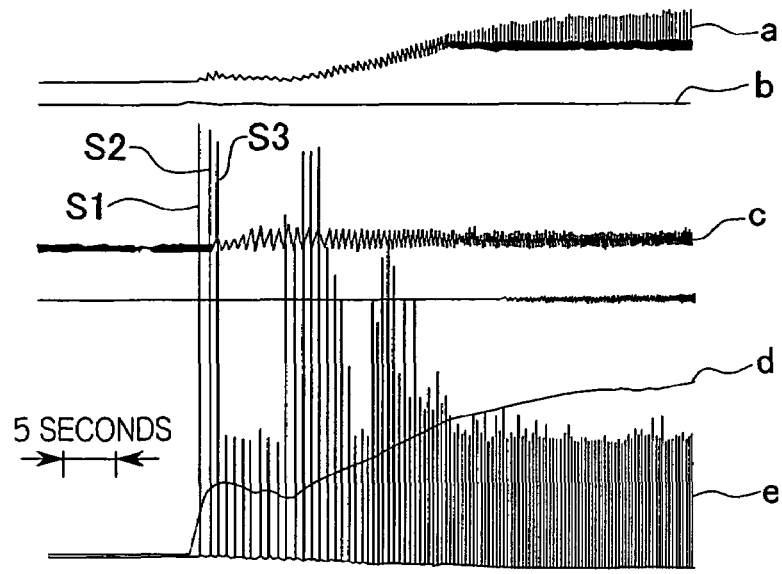
FIG. 6A is a chart showing an example of a data of starting of engine from a pilot oil ignition gas engine test apparatus when the position of the fuel rack is set at 8 mm.
Figure 6B:
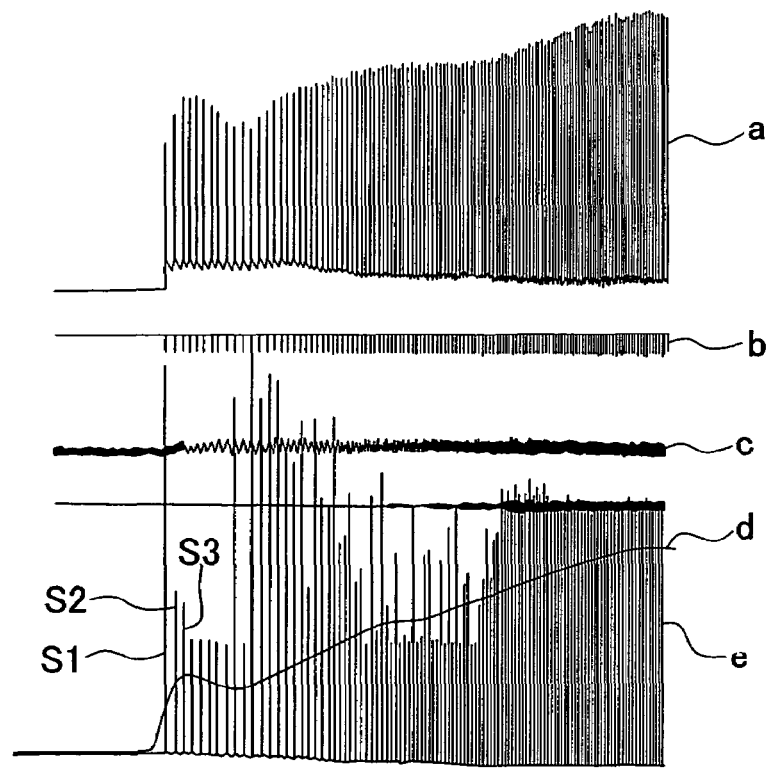
FIG. 6B is a chart showing an example of a data of starting of engine from a pilot oil ignition gas engine test apparatus when the position of the fuel rack is set at 15 mm.
Figure 7:
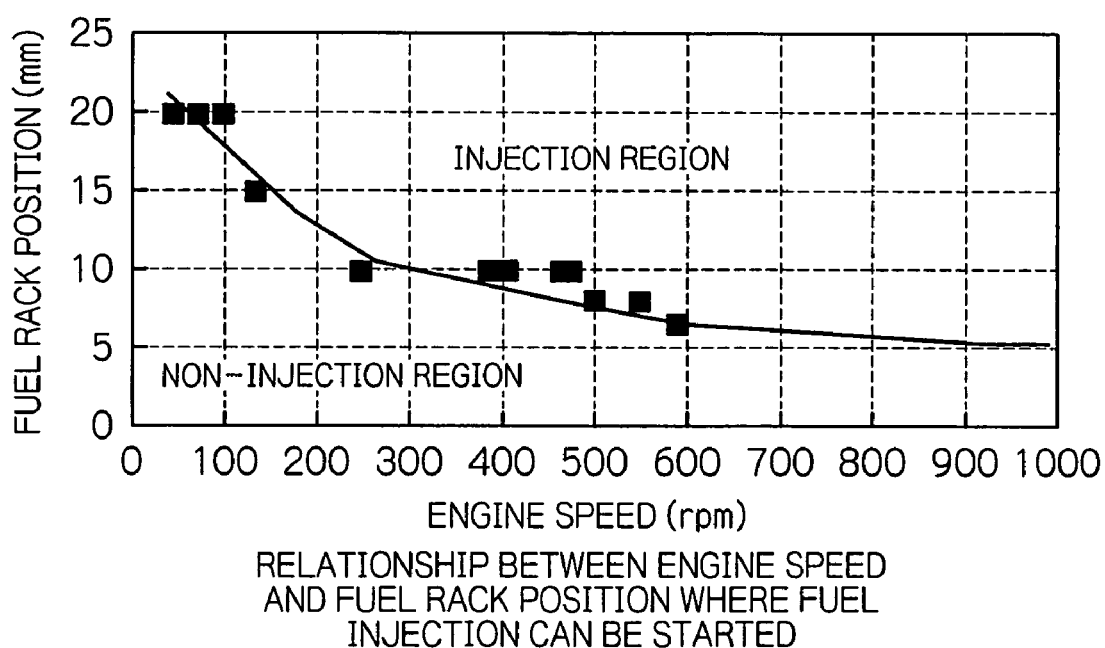
FIG. 7 is a chart showing a relationship between the engine speed and a fuel rack position that allows fuel injection to be commenced.

FIGS. 6A and 6B show the results recorded when a pilot oil ignition gas engine test apparatus having a single cylinder with a cylinder diameter of 260 mm is operated with the fuel rack position set to 8 mm or 15 mm and the ignition plug having been in operation from starting. The data for starting of engine is made up of the pressure a inside the pilot oil pipe, the valve lift b of the liquid fuel injection valve, the pressure c inside the gaseous fuel supply pipe, the engine speed d, and the pressure e inside the main combustion chamber. A and B correspond to the position of the fuel rack being set to 8 mm and 15 mm respectively.

When the position of the fuel rack is set to 8 mm, as is shown in FIG. 6A, the pressure a inside the pilot oil pipe has not reached the pressure required to open the liquid fuel injection valve. Therefore, the pilot oil is not injected from the liquid fuel injection valve (there is no valve lift b signal). Moreover, as a result of the fuel gas (i.e., the gaseous fuel) being supplied from the third cycle S3 after starting and thereafter (the action of the pressure c inside the gaseous fuel supply pipe), and then being burned by a spark ignition of the ignition plugs, the engine speed d increases. However, this increase proceeds slowly and the pressure e inside the main combustion chamber is also low.

In contrast, when the position of the fuel rack is set to 15 mm, as is shown in FIG. 6B, the pressure a inside the pilot oil pipe has reached a sufficient pressure to open the liquid fuel injection valve from the first starting cycle S1, and the pilot oil is injected from the liquid fuel injection valve (there is a valve lift b signal). Accordingly, the pressure e inside the main combustion chamber also increases due to the burning of the fuel-air mixture to accompany the supply of fuel gas from the third cycle S3, and the run-up in the engine speed becomes faster.

From these results it was evident that, in the pilot oil ignition gas engine, if the position of the fuel rack of the fuel injection pump is set at engine starting such that quantity of pilot oil that is discharged is increased, then the liquid fuel injection valve is placed in a state in which it opens more easily. In addition, the pilot oil is reliably injected from the liquid fuel injection valves into the precombustion chamber, ignited, and burnt, resulting in the starting of the engine proceeding smoothly and reliably. Namely, the effectiveness of the starter for pilot oil ignition gas engine of the present invention was confirmed.

Note that, in the starter for pilot oil ignition gas engine of the above described embodiment, a mode was employed in which the rack control actuator 15 is moved by an electromagnetic coil pulling an operating rod, however, instead of this, it is also possible to employ a structure in which a rotation of an electric servomotor is converted into a rectilinear motion by a bolt mechanism formed by screwing a nut onto a bolt shaft, and for the fuel rack 14 to be moved by this rectilinear motion. In this case, by controlling the quantity of electricity supplied to the electric servomotor, the amount of rotation thereof can be adjusted thereby enabling the position of the fuel rack 14 to be adjusted. Furthermore, the rack control actuator 15 may be a hydraulic servo cylinder and is not particularly restricted provided that it is able to move the fuel rack 14 to a predetermined position in response to a command from the control apparatus 18.

Moreover, in the starter for pilot oil ignition gas engine of the above described embodiment, a structure is employed in which the engine speed is measured using pulses generated by the detection of teeth surfaces of a ring gear 17 mounted on a crank shaft using an electromagnetic pickup or the like, however, instead of this it is also possible measure the engine speed by directly measuring the number of revolutions of a camshaft or some other shaft that rotates in conjunction with the engine crankshaft using a tacho generator or the like.

What is claimed is:

1. A starter for a pilot oil ignition gas engine in which, in a main combustion chamber partitioned off by a cylinder, a piston that moves reciprocally inside the cylinder, and a cylinder head having a precombustion chamber with a liquid fuel injection valve, a fuel air mixture made up of a gaseous fuel and air that is introduced into the main combustion chamber and is compressed by the piston is ignited by pilot oil injected from the liquid fuel injection valve into the precombustion chamber and burned, thereby enabling the pilot oil ignition gas engine to provide drive output, wherein there is provided a controller that controls a position of a fuel control rod that controls a discharge quantity of a fuel injection pump that supplies the pilot oil to the liquid fuel injection valve based on an engine speed, and wherein, in a low speed region of the engine speed, the controller controls the fuel control rod in a position where a discharge quantity of the fuel injection pump is increased, while, in a high speed region of the engine speed, the controller controls the fuel control rod in a position where a discharge quantity of the fuel injection pump is decreased.

2. A starter for pilot oil ignition gas engine according to claim 1, wherein, in the low speed region where the engine speed is a predetermined value or less, the position of fuel control rod is a fixed position where the discharge quantity of the fuel injection pump is at maximum, while, in the high speed region where the engine speed is a predetermined value or greater, the position of fuel control rod is a fixed position where the discharge quantity of the fuel injection pump is at minimum, while, in an intermediate speed region between the low speed region and the high speed region, the discharge quantity of the fuel injection pump changes in accordance with the engine speed from the fixed position where the discharge quantity of the fuel injection pump is at maximum to the fixed position where the discharge quantity of the fuel injection pump is at minimum.

3. A starter for pilot oil ignition gas engine according to claim 1, wherein the controller is provided with a speed sensor that detects the engine speed, a position control actuator that adjusts a position of the fuel control rod by moving the fuel control rod, and a control apparatus that, based on a relationship between the engine speed and the position of the fuel control rod that is set in advance, calculates a control objective position for the fuel control rod relative to the engine speed detected by the engine speed sensor, and moves the position control actuator such that the position of the fuel control rod is adjusted to the calculated control objective position.

4. A starter for pilot oil ignition gas engine according to claim 2, wherein the controller is provided with a speed sensor that detects the engine speed, a position control actuator that adjusts a position of the fuel control rod by moving the fuel control rod, and a control apparatus that, based on a relationship between the engine speed and the position of the fuel control rod that is set in advance, calculates a control objective position for the fuel control rod relative to the engine speed detected by the engine speed sensor, and moves the position control actuator such that the position of the fuel control rod is adjusted to the calculated control objective position.

5. A starter for pilot oil ignition gas engine according to claim 1, wherein, in the cylinder head there is further provided an ignition device that performs an ignition operation before the pilot oil is injected from the liquid fuel injection valve, and ignites the fuel air mixture of gaseous fuel and air that is compressed inside the main combustion chamber.

6. A starter for pilot oil ignition gas engine according to claim 2, wherein, in the cylinder head there is further provided an ignition device that performs an ignition operation before the pilot oil is injected from the liquid fuel injection valve, and ignites the fuel air mixture of gaseous fuel and air that is compressed inside the main combustion chamber.

7. A starter for pilot oil ignition gas engine according to claim 3, wherein, in the cylinder head there is further provided an ignition device that performs an ignition operation before the pilot oil is injected from the liquid fuel injection valve, and ignites the fuel air mixture of gaseous fuel and air that is compressed inside the main combustion chamber.

8. A starter for pilot oil ignition gas engine according to claim 4, wherein, in the cylinder head there is further provided an ignition device that performs an ignition operation before the pilot oil is injected from the liquid fuel injection valve, and ignites the fuel air mixture of gaseous fuel and air that is compressed inside the main combustion chamber.

9. A starter for pilot oil ignition gas engine according to claim 5, wherein the ignition device stops ignition operation when the engine speed reaches a rated speed.

10. A starter for pilot oil ignition gas engine according to claim 6, wherein the ignition device stops ignition operation when the engine speed reaches a rated speed.

11. A starter for pilot oil ignition gas engine according to claim 7, wherein the ignition device stops ignition operation when the engine speed reaches a rated speed.

12. A starter for pilot oil ignition gas engine according to claim 8, wherein the ignition device stops ignition operation when the engine speed reaches a rated speed.

* * * * *